US012565932B2

(12) United States Patent
Elliott et al.

(10) Patent No.: US 12,565,932 B2
(45) Date of Patent: Mar. 3, 2026

(54) CHOKE VALVE ASSEMBLY

(71) Applicant: Cameron International Corporation, Houston, TX (US)

(72) Inventors: Declan Elliott, Longford (IE); Scott Dahlgren, Alpine, UT (US); Edmund Peter McHugh, Longford (IE); Abinesh Gnanavelu, Longford (IE); Jerry Allen Martino, Houston, TX (US); David C. Hoyle, Salt Lake City, UT (US)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 18/885,959

(22) Filed: Sep. 16, 2024

(65) Prior Publication Data

US 2025/0003501 A1 Jan. 2, 2025

Related U.S. Application Data

(63) Continuation of application No. 17/758,529, filed as application No. PCT/US2021/013239 on Jan. 13, 2021, now Pat. No. 12,092,226.

(60) Provisional application No. 62/960,407, filed on Jan. 13, 2020.

(51) Int. Cl.
F16K 1/42 (2006.01)
F16K 25/00 (2006.01)
(52) U.S. Cl.
CPC .............. F16K 1/42 (2013.01); F16K 25/005 (2013.01)

(58) Field of Classification Search
CPC ........... F16K 1/42; F16K 25/005; F16K 1/385
See application file for complete search history.

(56) References Cited

U.S. PATENT DOCUMENTS

| | | |
|---|---|---|
| 4,705,062 A | 11/1987 | Baker |
| 4,732,364 A | 3/1988 | Seger et al. |
| 5,370,357 A | 12/1994 | Jones |
| 6,878,447 B2 | 4/2005 | Griffin |

(Continued)

FOREIGN PATENT DOCUMENTS

| | | |
|---|---|---|
| CN | 1048093 A | 12/1900 |
| JP | 10026238 A | 1/1998 |

OTHER PUBLICATIONS

Search Report and Written Opinion of International Patent Application No. PCT/US2021/013239 dated May 4, 2021, 10 pages.

*Primary Examiner* — Daphne M Barry
(74) *Attorney, Agent, or Firm* — Kyle R. Miiller

(57) ABSTRACT

A seat assembly for a choke valve assembly includes a housing having an internal passage, in which the housing is formed from a non-superhard material. The seat assembly also includes a seat disposed within the internal passage of the housing. The seat is configured to engage a needle of the choke valve assembly while the choke valve assembly is in a closed state, and the seat is formed from a first superhard material. In addition, the seat assembly includes an annular insert disposed within the internal passage of the housing downstream from the seat. The annular insert is formed from a second superhard material, and a maximum cross-sectional area of the seat along a longitudinal axis of the seat assembly is greater than a maximum cross-sectional area of the annular insert along the longitudinal axis.

18 Claims, 6 Drawing Sheets

(56) References Cited

U.S. PATENT DOCUMENTS

| | | | |
|---|---|---|---|
| RE42,772 E | 10/2011 | McGee | |
| 8,109,330 B1 | 2/2012 | Miller | |
| 10,378,309 B2 | 8/2019 | Elliott et al. | |
| 10,480,282 B2 | 11/2019 | Quin et al. | |
| 11,280,141 B2 | 3/2022 | Quin et al. | |
| 11,815,191 B2 | 11/2023 | Elliott | |
| 12,092,226 B2 * | 9/2024 | Elliott | F16K 25/005 |
| 2007/0163655 A1 | 7/2007 | Hunter | |
| 2019/0032792 A1 | 1/2019 | Miller | |

* cited by examiner

CHOKE VALVE ASSEMBLY

CROSS REFERENCE TO RELATED APPLICATION

This application is a continuation of U.S. patent application Ser. No. 17/758,529, filed Jul. 8, 2022, which is a National Stage entry of International Patent Application Serial No. PCT/US2021/013239, filed Jan. 13, 2021, which claims priority from and the benefit of U.S. Provisional Application Ser. No. 62/960,407, entitled "EROSION RESISTANT CHOKE VALVE" and filed Jan. 13, 2020, which are hereby incorporated by reference in its entirety.

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

In order to meet consumer and industrial demand for natural resources, companies search for and extract oil, natural gas, and other subterranean resources from the earth. Once a desired subterranean resource is discovered, drilling and production systems are employed to access and extract the resource. These systems may be located onshore or offshore depending on the location of a desired resource. Production systems may include a variety of flow control devices to control a flow rate, a pressure, other fluid properties, or a combination thereof, of fluid flowing through the production system. For example, choke valves may be used to control the flow of production fluid (e.g., oil, natural gas, etc.) from a well.

Certain choke valves (e.g., needle valves) include a seat and a needle movable relative to the seat. While the needle is engaged with the seat, the flow of fluid through the choke valve is substantially blocked. As the needle moves away from the seat, a cross-sectional area of an orifice formed by the seat and the needle progressively increases, thereby increasing the flow rate of the fluid through the choke valve. An actuator coupled to the needle may drive the needle to move relative to the seat. In certain applications, the fluid may contain a significant amount of abrasive material (e.g., sand, rock particles, etc.). Over time, flow of the abrasive material through the choke valve may cause the needle and/or the seat to wear, thereby changing the shape of the needle and/or the seat. As a result, the performance of the choke valve may be altered, and/or the operational effectiveness of the choke valve may be reduced.

BRIEF DESCRIPTION

In certain embodiments, a seat assembly for a choke valve assembly includes a housing having an internal passage, in which the housing is formed from a non-superhard material. The seat assembly also includes a seat disposed within the internal passage of the housing. The seat has a flow passage extending through the seat, the seat is configured to engage a needle of the choke valve assembly while the choke valve assembly is in a closed state, and the seat is formed from a first superhard material. In addition, the seat assembly includes an annular insert disposed within the internal passage of the housing downstream from the seat. The annular insert has a flow passage extending through the annular insert, the annular insert is formed from a second superhard material, and a maximum cross-sectional area of the seat along a longitudinal axis of the seat assembly is greater than a maximum cross-sectional area of the annular insert along the longitudinal axis.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
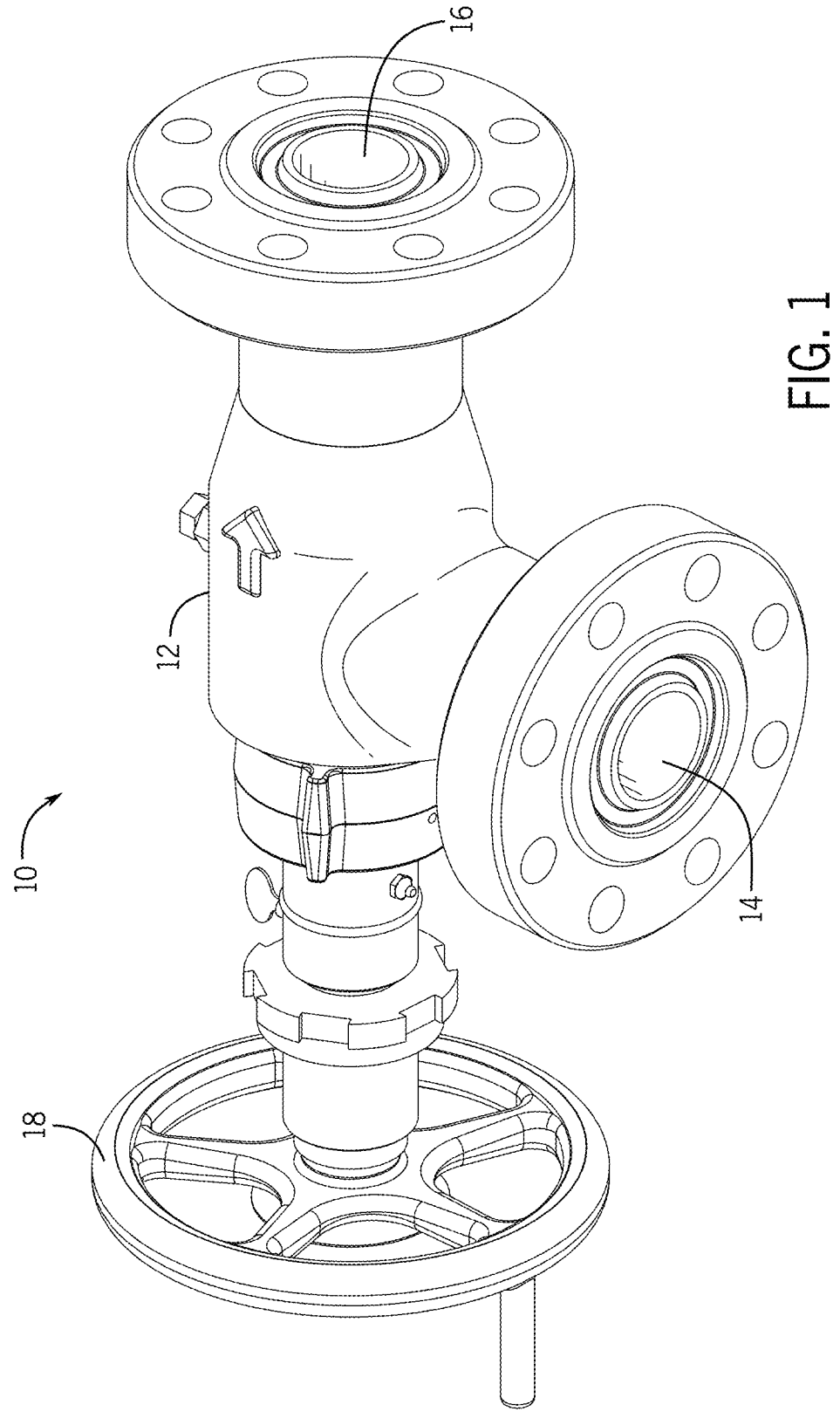
FIG. 1 is a perspective view of an embodiment of a choke valve assembly.

FIG. 1 is a perspective view of an embodiment of a choke valve assembly 10. As illustrated, the choke valve assembly 10 includes a body 12 having an inlet 14 and an outlet 16. While the choke valve assembly 10 is in an open state, fluid flow through the body 12 from the inlet 14 to the outlet 16 is enabled. In addition, while the choke valve assembly 10 is in a closed state, fluid flow through the body 12 is blocked. In the illustrated embodiment, the choke valve assembly 10 includes a handle 18 configured to transition the choke valve assembly 10 between the open and closed states via manual actuation of the handle 18. In other embodiments, the choke valve assembly may include an actuator (e.g., alone or in addition to the handle), such as a hydraulic actuator, a pneumatic actuator, an electromechanical actuator, another suitable actuator, or a combination thereof, configured to drive the choke valve assembly between the open and closed states. The choke valve assembly 10 may be used within a production system to control a flow rate of fluid from a well, or within any other suitable system to control fluid flow.

In certain embodiments, the choke valve assembly 10 includes a seat assembly. The seat assembly includes a housing having an internal passage, and the housing is formed from a non-superhard material. The seat assembly also includes a seat disposed within the internal passage of the housing. The seat has a flow passage extending through the seat, and the seat is formed from a first superhard material. In addition, the seat is configured to engage a needle of the choke valve assembly while the choke valve assembly is in the closed state. Furthermore, the seat assembly includes an annular insert disposed within the internal passage of the housing downstream from the seat. The annular insert has a flow passage extending through the annular insert, and the annular insert is formed from a second superhard material. A maximum cross-sectional area of the seat along a longitudinal axis of the seat assembly is greater than a maximum cross-sectional area of the annular insert along the longitudinal axis. Because the highest fluid pressure within the choke valve assembly 10 may be present at the seat, the seat may experience wear during operation of the choke valve assembly. Accordingly, the larger cross-sectional area of the seat may increase the longevity of the seat assembly. In addition, due to the high cost of superhard material, the smaller maximum cross-sectional area of the annular insert may reduce the cost of the seat assembly.

Furthermore, in certain embodiments, the choke valve assembly 10 includes a needle configured to move along a longitudinal axis of the choke valve assembly. The choke valve assembly 10 also includes a shaft coupled to the needle and configured to drive the needle to move along the longitudinal axis. Furthermore, the choke valve assembly 10 includes a seat assembly having a housing configured to be disposed within the body 12 of the choke valve assembly 10. The housing has an internal passage extending along the longitudinal axis and an inlet extending through the housing along a radial axis of the choke valve assembly. In addition, the housing has an engagement portion positioned on a first longitudinal side of the inlet, and the engagement portion is configured to engage the needle to substantially block movement of the needle along the radial axis. The seat assembly also includes a seat disposed within the internal passage of the housing on a second longitudinal side of the inlet, opposite the first longitudinal side. The seat has a flow passage extending through the seat, and the seat is configured to engage the needle while the choke valve assembly 10 is in the closed state. Because the engagement portion of the housing substantially blocks movement of the needle along the radial axis, vibration of the needle due to the high-pressure flow of fluid through the choke valve assembly may be substantially reduced. Accordingly, the longevity of the needle may be significantly increased, thereby reducing maintenance costs and increasing the operational time of the choke valve assembly.

In addition, in certain embodiments, the choke valve assembly 10 includes a seat assembly having a seat. The seat includes a flow passage extending through the seat, and the seat is configured to engage a needle of the choke valve assembly while the choke valve assembly is in the closed state. In addition, the seat includes at least one recessed cavity formed along the flow passage of the seat. The recessed cavity/cavities are configured to induce turbulence within the fluid flow through the choke valve assembly 10, thereby reducing the fluid velocity. As a result, particles entrained within the fluid may impact the downstream components with less force, thereby increasing the longevity of the seat assembly.

Figure 2:
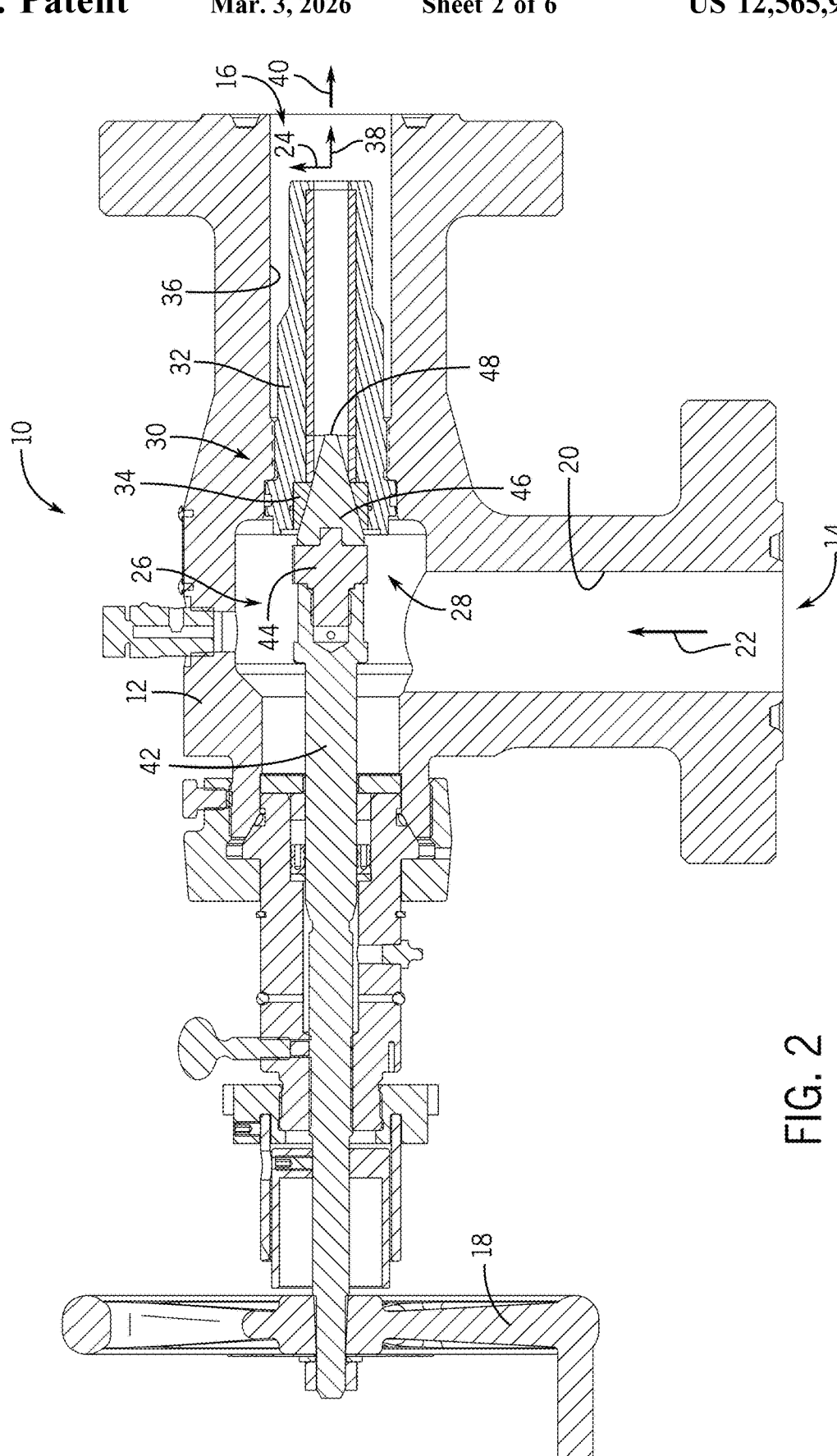
FIG. 2 is a cross-sectional view of the choke valve assembly of FIG. 1.

FIG. 2 is a cross-sectional view of the choke valve assembly 10 of FIG. 1. As previously discussed, the body 12 of the choke valve assembly includes an inlet 14 and an outlet 16. Fluid (e.g., from a well, etc.) may enter the inlet 14 and flow through an inlet passage 20 of the body 12 along an inlet flow direction 22 (e.g., along a radial axis 24 of the choke valve assembly 10). The fluid entering the inlet 14 may be at a relatively high pressure (e.g., greater than 500 psi, greater than 1000 psi, greater than 5000 psi, greater than 10,000 psi, greater than 15,000 psi, greater than 20,000 psi, greater than 25,000 psi, or greater than 30,000 psi), and a significant amount of abrasive material (e.g., sand, particles, etc.) may be entrained within the fluid. For example, the fluid may enter the inlet 14 after being used for fracking a reservoir and may, therefore, include a significant amount of sand. The fluid flows through the inlet passage 20 along the inlet flow direction 22 to a cavity 26 within the body 12.

As illustrated, the choke valve assembly 10 includes a needle 28 and a seat assembly 30 (e.g., forming a choke trim). In the illustrated embodiment, the seat assembly 30 includes a seat assembly housing 32 and a seat 34 (e.g., forming a positive bean). The seat assembly housing 32 includes an internal passage, and the seat 34 is disposed within the internal passage of the housing. In addition, the seat 34 has a flow passage extending through the seat 34. With the choke valve assembly 10 in the illustrated closed state, the needle 28 is engaged with the seat 34, thereby blocking flow of the fluid from the cavity 26 to an outlet passage 36 that extends to the outlet 16. Movement of the needle 28 away from the seat assembly 30 along a longitudinal axis 38 of the choke valve assembly 10 forms an orifice between the needle 28 and the seat 34, thereby facilitating flow of the fluid from the cavity 26, through the flow passage of the seat 34, and into the outlet passage 36. The fluid then flows through the outlet passage 36 along an outlet flow direction 40 (e.g., along the longitudinal axis 38) to the outlet 16. Due to the shape of the needle 28, the cross-sectional area of the orifice increases as the needle 28 moves away from the seat 34. Accordingly, the flow rate through the choke valve assembly 10 may be controlled by controlling the position of the needle 28 relative to the seat 34.

As illustrated, the needle 28 is coupled to a shaft 42 (e.g., by a threaded connection, a press-fit connection, a shrink-fit connection, a brazed connection, an adhesive connection, etc.), and the shaft 42 supports the needle 28 within the body 12 of the choke valve assembly 10. In addition, the shaft 42 is configured to drive the needle 28 to move along the longitudinal axis 38, thereby controlling the position of the needle 28 relative to the seat 34. In the illustrated embodiment, the handle 18 of the choke valve assembly 10 is coupled to the shaft and configured to drive the shaft 42 to move along the longitudinal axis 38. While the shaft 42 is driven to move by the handle 18 in the illustrated embodiment, in other embodiments, the shaft may be driven to move by another suitable actuator (e.g., alone or in addition to the handle), such as a hydraulic actuator, a pneumatic actuator, an electromechanical actuator, another suitable actuator, or a combination thereof.

Press-fitting includes coupling components to one another via engagement of a protrusion of one component with a recess of the other component (e.g., in which a cross-sectional area of the protrusion is greater than or equal to the cross-sectional area of the recess). Components may be coupled by press-fitting while the components are at an ambient temperature via application of an external force. Furthermore, shrink-fitting includes coupling components to one another via adjusting the temperature of at least one component, engaging a protrusion of one component with a recess of the other component, and enabling the at least one component to return to the ambient temperature. For example, the components may be coupled by shrink-fitting via heating the component with the recess to expand the recess, disposing the protrusion within the recess, and enabling the heated component to return to the ambient temperature. Additionally or alternatively, in certain embodiments, the components may be coupled by shrink-fitting via cooling the component with the protrusion to contract the protrusion, disposing the protrusion within the recess, and enabling the cooled component to return to the ambient temperature. In addition, brazing includes disposed a brazing material (e.g., silver solder, etc.) between components to couple the components to one another. Furthermore, bonding includes disposing an adhesive (e.g., zinc, cement, polyether ether ketone (PEEK), etc.) between components to couple the components to one another.

In the illustrated embodiment, the needle 28 includes a base portion 44 and a tip portion 46. As illustrated, the base portion 44 is coupled to the shaft 42 (e.g., by a threaded connection, a mechanical connection, a press-fit connection, a shrink-fit connection, a brazed connection, an adhesive connection, etc.), and the tip portion 46 is coupled to the base portion (e.g., by a threaded connection, a press-fit connection, a shrink-fit connection, a brazed connection, an adhesive connection, etc.). The base portion 44 is formed from a non-superhard material, the tip portion is formed from a superhard material, and a tip 48 of the needle 28 is only formed by the tip portion 46. As used herein, "superhard" refers to a material having a hardness of greater than or equal to 20 GPa based on Vickers hardness testing, and/or a material having a hardness of greater than or equal to 4500 Hardness Brinell (B) on the Brinell scale. Superhard materials may include diamond (e.g., polycrystalline diamond) or other superhard material(s), such as cubic boron nitride. Forming the tip portion 46 of the needle 28 from superhard material may substantially increase the longevity of the needle 28 (e.g., as compared to a needle in which the tip portion is formed from a non-superhard material). For example, a significant amount of abrasive material (e.g., sand, particles, etc.) may be entrained within the fluid flowing through the choke valve assembly 10 (e.g., while the choke valve assembly is in the open state). The abrasive material may flow through the orifice, which is formed by the tip portion 46 of the needle 28 and the seat 34, at a substantial speed. However, because the tip portion 46 of the needle 28 is formed from superhard material, wear/abrasion of the tip portion 46 may be substantially reduced (e.g., as compared to a needle having a tip portion formed from a non-superhard material), thereby increasing the longevity of the needle.

Furthermore, in certain embodiments, the seat 34 of the seat assembly 30 may be formed from superhard material (e.g., diamond, etc.). As previously discussed, the orifice is formed by the tip portion 46 of the needle 28 and the seat 34, and fluid containing a significant amount of abrasive material may flow through the orifice at a substantial speed. Because the seat 34 is formed from superhard material, wear/abrasion of the seat 34 may be substantially reduced (e.g., as compared to a seat formed from a non-superhard material), thereby increasing the longevity of the seat 34. Furthermore, in the illustrated embodiment, the needle has an angled seat-engaging surface, and the seat has an angled needle-engaging surface. In certain embodiments, the angle of the seat-engaging surface of the needle and the angle of the needle-engaging surface of the seat may be substantially equal, thereby establishing an effective seal while the choke valve is in the closed state.

While the tip portion 46 of the needle 28 and the seat 34 of the seat assembly 30 are formed from superhard material in the illustrated embodiment, in other embodiments, the tip portion and/or the seat may be formed from a non-superhard material. Furthermore, the seat assembly housing 32 may be formed from a superhard material or a non-superhard material. In addition, while the seat assembly 30 includes a seat 34 and a seat assembly housing 32 in the illustrated embodiment, in other embodiments, the housing may be omitted (e.g., the seat may couple to the body of the choke valve assembly). Furthermore, while the needle 28 includes the tip portion 46 and the base portion 44 in the illustrated embodiment, in other embodiments, the needle may include more or fewer portions (e.g., 1, 2, 3, 4, or more). In addition, the tip portion 46 of the needle 28 may be removably coupled to the base portion 44 of the needle 28, the needle 28 may be removably coupled to the shaft 42, the seat 34 may be removably coupled to the seat assembly housing 32, the seat assembly housing 32 may be removably coupled to the body 12 of the choke valve assembly 10, or a combination thereof. Accordingly, the tip portion 46 of the needle 28, the needle 28, the seat 34, the seat assembly 30, or a combination thereof, may be removed and replace (e.g., due to wear of component(s), to establishing different office configurations for different applications, etc.).

In certain embodiments, a cover layer formed from superhard material may be applied to an inner surface of the inlet passage 20, an inner surface of the outlet passage 36, an inner surface of the cavity 26, or a combination thereof. For example, sleeve(s) formed from superhard material (e.g., diamond, etc.) may be formed separately from the housing and coupled to the inner surface(s) of the inlet passage and/or the outlet passage. Each sleeve may be coupled to the respective passage by a brazed connection, an adhesive connection, a press-fit connection, a shrink-fit connection, a threaded connection, a mechanical connection, a fastener connection, other suitable connection(s), or a combination thereof. Furthermore, in certain embodiments, the cover layer may be formed on the inner surface(s) of the inlet passage, the outlet passage, the cavity, or a combination thereof, by an infiltrate process.

As used herein, a component "formed from" superhard material refers to a component in which at least the fluid-engaging surface(s) of the component are formed entirely by the superhard material. For example, the component may include outer layer(s) formed entirely of superhard material, in which the outer layer(s) are coupled to a base/core of the component (e.g., by a brazed connection, an adhesive connection, a press-fit connection, a shrink-fit connection, a mechanical connection, a fastener connection, a threaded connection, other suitable connection(s), or a combination thereof) or formed on the base/core of the component (e.g., by an infiltrate process). Furthermore, the component may be formed entirely of the superhard material (e.g., by a machining/engraving/ablation process, by a molding process, by other suitable process(es), or a combination thereof). For example, a diamond component may be formed to a desired shape within a press. Additionally or alternatively, a diamond component may be shaped via a laser ablation process.

In the infiltrate process, a diamond cover layer may be grown onto the base/core. For example, layers of diamond are grown onto the base/core until a diamond cover layer having a desired thickness is established. The layers closest to the core may include a mixture of the non-superhard material of the base/core and diamond. For example, a layer closest to the non-superhard material of the base/core may be substantially non-superhard material with a small amount of diamond. As additional layers are added/grown, the content of diamond relative to the base/core material increases until entirely diamond layers are formed. Using the infiltrate process to form the cover layer may reduce the cost of the component, as compared to forming solid diamond piece(s) into the shape of the cover layer. In certain embodiments, the cover layer may be formed separately from the base/core using the infiltrate process and coupled to the base/core.

Figure 3:
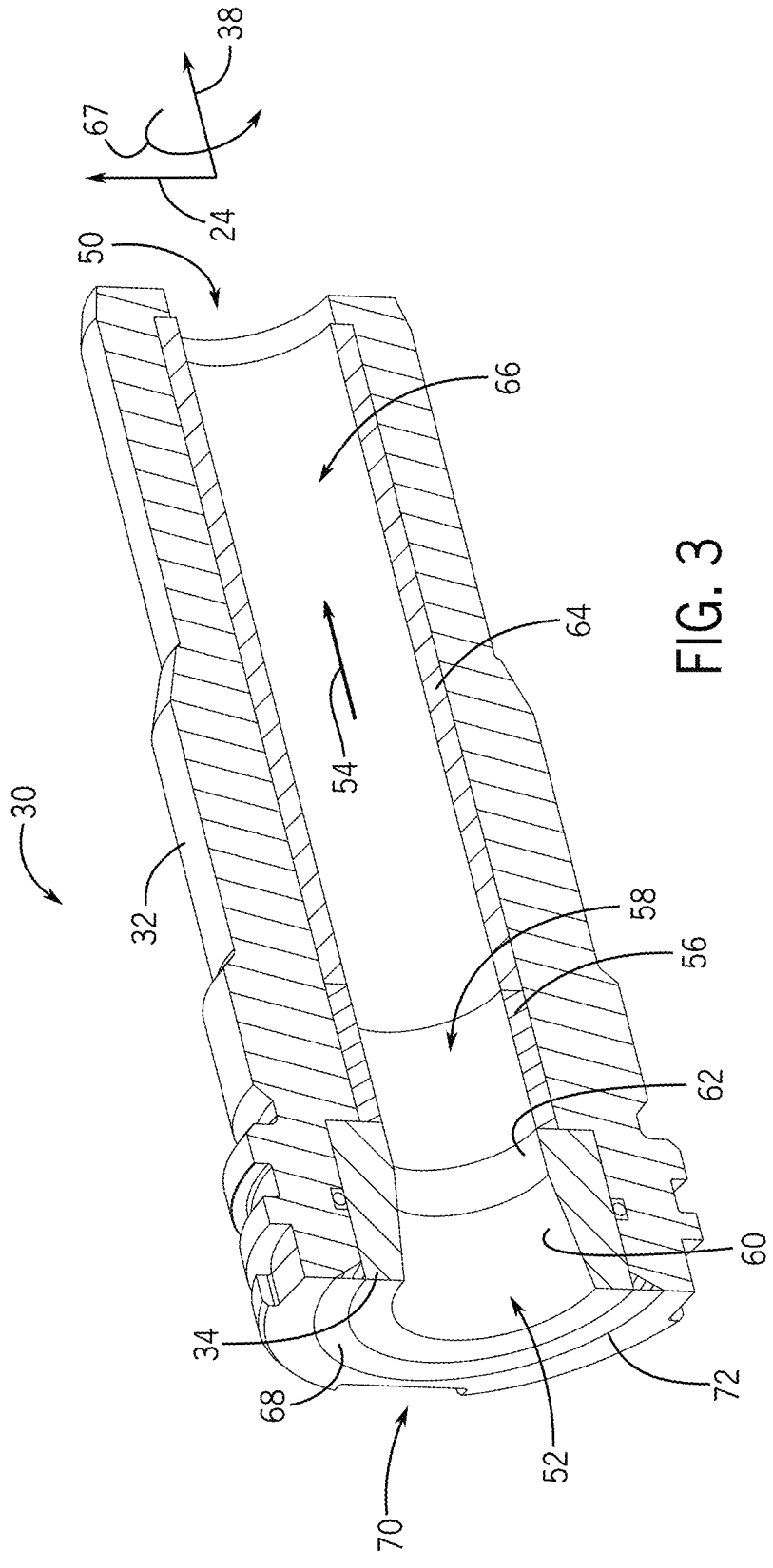
FIG. 3 is a cross-sectional perspective view of an embodiment of a seat assembly that may be employed within the choke valve assembly of FIG. 1.

FIG. 3 is a cross-sectional perspective view of an embodiment of a seat assembly 30 that may be employed within the choke valve assembly of FIG. 1. As previously discussed, the seat assembly 30 includes a seat assembly housing 32 having an internal passage 50. In addition, the seat assembly 30 includes a seat 34 disposed within the internal passage 50 of the seat assembly housing 32. As illustrated, the seat 34 has a flow passage 52 extending through the seat (e.g., along the longitudinal axis 38). The seat 34 is configured to engage the needle of the choke valve assembly while the choke valve assembly is in the closed state. In addition, the seat 34 and the needle are configured to form an orifice while the choke valve assembly is in the open state, thereby enabling fluid to flow through the flow passage 52 along a flow direction 54 (e.g., along the longitudinal axis 38). In the illustrated embodiment, the seat assembly housing 32 is formed from a non-superhard material (e.g., first non-superhard material), such as steel, and the seat 34 is formed from a first superhard material (e.g., diamond, etc.). As previously discussed, because the seat 34 is formed from superhard material, wear/abrasion of the seat 34 may be substantially reduced (e.g., as compared to a seat formed from a non-superhard material), thereby increasing the longevity of the seat 34.

In the illustrated embodiment, the seat assembly 30 includes an annular insert 56 (e.g., first annular insert). As illustrated, the annular insert 56 is disposed within the internal passage 50 of the seat assembly housing 32 downstream from the seat 34 along the flow direction 54. The annular insert 56 has a flow passage 58 extending through the annular insert 56, and the annular insert 56 is formed from a second superhard material. In certain embodiments, the second superhard material of the annular insert 56 may be the same as the superhard material of the seat 34. For example, in certain embodiments, the seat 34 and the annular insert 56 may be formed from diamond (e.g., polycrystalline diamond). In other embodiments, the first superhard material of the seat 34 may be harder than the second superhard material of the annular insert 56 (e.g., because the highest fluid pressure within the choke valve assembly may be present at the seat 34, and the softer superhard material may be less expensive than the harder superhard material). In the illustrated embodiment, a maximum cross-sectional area of the seat 34 along the longitudinal axis 38 is greater than a maximum cross-sectional area of the annular insert 56 along the longitudinal axis 38. Because the highest fluid pressure within the choke valve assembly may be present at the seat 34, the seat 34 may experience more wear than the annular insert 56 during operation of the choke valve assembly. Accordingly, the larger cross-sectional area of the seat 34 may increase the longevity of the seat assembly 30. In addition, due to the high cost of superhard material, the smaller maximum cross-sectional area of the annular insert 56 may reduce the cost of the seat assembly 30.

As used herein, "cross-sectional area along the longitudinal axis" refers to a cross-sectional area of the component within a plane that is perpendicular to the longitudinal axis. Accordingly, the "maximum cross-sectional area along the longitudinal axis" refers to the maximum cross-sectional area of the component among each of the planes formed along the longitudinal axis. In the illustrated embodiment, the annular insert 56 has a substantially constant cross-sectional area along the longitudinal axis 38, and the cross-sectional area of the seat 34 varies along the longitudinal axis 38. However, in other embodiments, the cross-sectional area of the annular insert may vary along the longitudinal axis, and/or the cross-sectional area of the seat may be substantially constant along the longitudinal axis. In the illustrated embodiment, a minimum cross-sectional area of the seat 34 along the longitudinal axis 38 is greater than the maximum cross-sectional area of the annular insert 56 along the longitudinal axis 38, thereby further increasing the longevity of the seat 34. However, in other embodiments, the minimum cross-sectional area of the seat along the longitudinal axis may be equal to or less than the maximum cross-sectional area of the annular insert along the longitudinal axis.

Furthermore, in the illustrated embodiment, a minimum cross-sectional area of the flow passage 52 of the seat 34 along the longitudinal axis 38 is substantially equal to the cross-sectional area of the flow passage 58 of the annular insert 56 along the longitudinal axis 38. As previously discussed, the seat 34 includes an angled portion 60 configured to interface with the angled portion of the needle, thereby substantially blocking fluid flow through the choke valve assembly while the choke valve assembly is in the closed state. As illustrated, the seat 34 includes a substantially flat portion 62 positioned downstream from the angled portion 60 along the flow direction 54, and the substantially flat portion 62 forms the minimum cross-sectional area of the flow passage 52 of the seat 34 along the longitudinal axis 38. Because the minimum cross-sectional area of the flow passage 52 of the seat 34 along the longitudinal axis 38 is substantially equal to the cross-sectional area of the flow passage 58 of the annular insert 56 along the longitudinal axis 38, the fluid may flow substantially smoothly through the seat assembly 30. However, in other embodiments, the minimum cross-sectional area of the flow passage of the seat along the longitudinal axis may be greater than or less than the cross-sectional area of the flow passage of the annular insert along the longitudinal axis. In addition, while the cross-sectional area of the flow passage of the annular insert along the longitudinal axis is substantially constant in the illustrated embodiment, in other embodiments, the cross-sectional area of the flow passage of the annular insert may vary along the longitudinal axis.

In the illustrated embodiment, the seat assembly 30 includes a second annular insert 64 disposed within the internal passage 50 of the seat assembly housing 32 downstream from the first annular insert 56 along the flow direction 54. As illustrated, the second annular insert 64 has a flow passage 66 extending through the second annular insert 64. In addition, the second annular insert is formed from a second non-superhard material (e.g., tungsten carbide, etc.). Because the fluid pressure and/or the fluid velocity may decrease along the flow direction 54, forming the second annular insert from a non-superhard material may substantially reduce the cost of the seat assembly without substantially reducing the longevity of the seat assembly. In certain embodiments, the second non-superhard material of the second annular insert 64 may be harder than the first non-superhard material of the seat assembly housing 52.

In the illustrated embodiment, the cross-sectional area of the second annular insert 64 along the longitudinal axis 38 is substantially equal to the cross-sectional area of the first annular insert 56 along the longitudinal axis. However, in other embodiments, the cross-sectional area of the second annular insert along the longitudinal axis may be greater than or less than the cross-sectional area of the first annular insert along the longitudinal axis. Furthermore, in the illustrated embodiment, the cross-sectional area of the second annular insert 64 is substantially constant along the longitudinal axis 38. However, in other embodiments, the cross-sectional area of the second annular insert may vary (e.g., increase or decrease) along the longitudinal axis 38. In addition, the cross-sectional area of the flow passage 66 of the second annular insert 64 along the longitudinal axis 38 is substantially equal to the cross-sectional area of the flow passage 58 of the first annular insert 56 along the longitudinal axis 38. Accordingly, the fluid may flow substantially smoothly through the seat assembly 30. However, in other embodiments, the cross-sectional area of the flow passage of the second annular insert along the longitudinal axis may be greater than or less than the cross-sectional area of the flow passage of the first annular insert along the longitudinal axis. Furthermore, while the cross-sectional area of the flow passage of the second annular insert along the longitudinal axis is substantially constant in the illustrated embodiment, in other embodiments, the cross-sectional area of the flow passage of the second annular insert may vary along the longitudinal axis.

In the illustrated embodiment, the seat 34, the first annular insert 56, and the second annular insert 64 are continuous along a circumferential axis 67. For example, at least one of the seat, the first annular insert, or the second annular insert may be formed from a single piece of material. However, in certain embodiments, at least one of the seat, the first annular insert, or the second annular insert may be formed from multiple circumferential elements (e.g., 2, 3, 4, etc.) that collectively form an annular structure. For example, at least one of the seat, the first annular insert, or the second annular insert may include a first half and a second half, and each half may form a respective portion of the circumferential extent of the respective component. Furthermore, while the seat assembly includes two annular inserts positioned downstream from the seat in the illustrated embodiment, in other embodiments, the seat assembly may include more or fewer annular inserts (e.g., 0, 1, 3, 4, etc.) positioned downstream from the seat. For example, the second annular insert may be omitted (e.g., and the internal passage of the housing may form a downstream portion of the flow path through the seat assembly). Furthermore, while the first annular insert is formed from a superhard material and the second annular insert is formed from a non-superhard material in the illustrated embodiment, in other embodiments, the first annular insert may be formed from a non-superhard material (e.g., tungsten carbide, etc.), and/or the second annular insert may be formed from a superhard material (e.g., diamond, cubic boron nitride, etc.). In addition, in embodiments in which the seat assembly includes three or more annular inserts, the upstream annular insert may be formed from superhard material, the downstream annular insert may be formed from non-superhard material, and the intermediate annular insert(s) may be formed from a combination of superhard and non-superhard material.

In the illustrated embodiment, the seat assembly 30 includes a third annular insert 68 disposed between the seat 34 and the seat assembly housing 32 at an upstream longitudinal end 70 of the seat assembly 30. As illustrated, the seat 34, the seat assembly housing 32, and the third annular insert 68 form an upstream longitudinal face 72 of the seat assembly 30. The third annular insert 68 is formed from a third non-superhard material, and the third non-superhard material is harder than the first non-superhard material of the seat assembly housing 32. For example, the third annular insert 68 may be formed from tungsten carbide, and the seat assembly housing 32 may be formed from steel. Because the third non-superhard material of the third annular insert 68 is harder than the first non-superhard material of the seat assembly housing 32 of the seat assembly 30, wear proximate to the inlet of the orifice may be substantially reduced, thereby increasing the longevity of the seat assembly 30. While the seat assembly includes the third annular insert 68 in the illustrated embodiment, in other embodiments, the third annular insert may be omitted. Alternatively, the seat assembly may include multiple annular inserts disposed between the seat and the housing at the upstream longitudinal end of the seat assembly, such that the seat, the housing, and the annular inserts form the upstream longitudinal face of the seat assembly. For example, the hardness of the annular seats may decrease along the radial axis, such that the hardest annular seat is positioned closest to the orifice.

In the illustrated embodiment, the third annular insert 68 is continuous along the circumferential axis 67. For example, the third annular insert may be formed from a single piece of material. However, in certain embodiments, the third annular insert may be formed from multiple circumferential elements (e.g., 2, 3, 4, etc.) that collectively form an annular structure. For example, the third annular insert may include a first half and a second half, and each half may form a respective portion of the circumferential extent of the third annular insert. While the seat and each annular insert have a substantially circular shape in the illustrated embodiment, in other embodiments, the seat and/or at least one annular insert may have a non-circular shape (e.g., elliptical, polygonal, etc.).

As previously discussed, the seat 34 may be removably coupled to the seat assembly housing 32 of the seat assembly 30. Additionally or alternatively, in certain embodiments, the first annular insert 56, the second annular insert 64, the third annular insert 68, or a combination thereof, may be removably coupled to the seat assembly housing 32. The seat and the annular inserts may be coupled to the housing by any suitable connections. For example, each of the seat and the annular inserts may be coupled to the housing by a brazed connection, an adhesive connection, a press-fit connection, a shrink-fit connection, a mechanical connection, a threaded connection, a fastener connection, other suitable connection(s), or a combination thereof. In certain embodiments, the mechanical connection may include a stop (e.g., coupled to the housing, formed by the housing, etc.) configured to block movement of the annular insert(s) away from the seat along the longitudinal axis. In such embodiments, the first annular insert and/or the second annular insert may be disposed within the internal passage of the seat assembly housing, the stop may block movement of the annular insert(s) away from the seat along the longitudinal axis, and the seat (e.g., which may be coupled to the housing by any suitable connection) may block movement of the annular insert(s) toward the seat along the longitudinal axis. Furthermore, in certain embodiments, the mechanical connection may include a stop (e.g., coupled to the housing, formed by the housing, etc.) configured to block movement of the seat away from the annular insert(s) along the longitudinal axis. In such embodiments, the seat may be disposed within the internal passage of the seat assembly housing, the stop may block movement of the seat away from the annular insert(s) along the longitudinal axis, and the first annular insert (e.g., which may be coupled to the housing by any suitable connection in embodiments in which the second annular insert is omitted) or the second annular insert (e.g., which may be coupled to the housing by any suitable connection) may block movement of the seat toward the annular insert(s) along the longitudinal axis.

Figure 4:
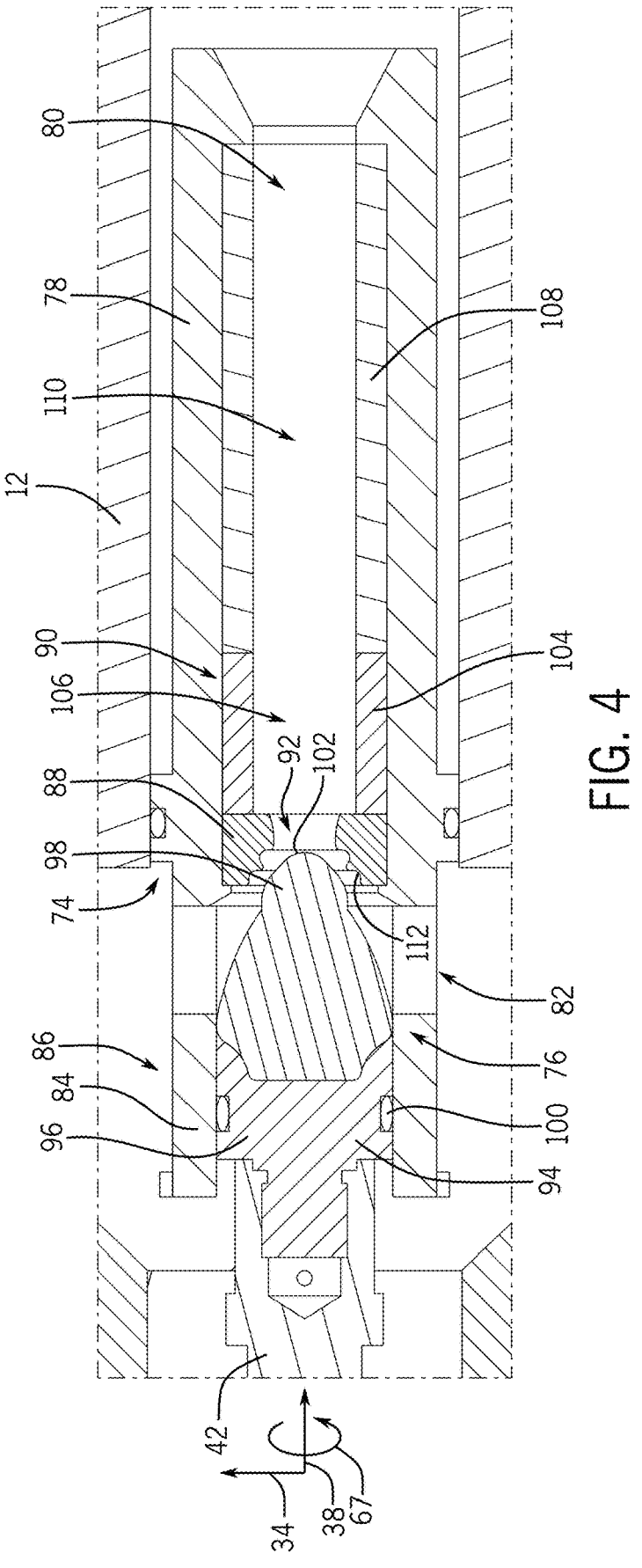
FIG. 4 is a cross-sectional view of another embodiment of a seat assembly and an embodiment of a needle configured to interface with the seat assembly.

FIG. 4 is a cross-sectional view of another embodiment of a seat assembly 74 and an embodiment of a needle 76 configured to interface with the seat assembly 74. The seat assembly 74 and the needle 76 may be used within a choke valve assembly, such as the choke valve assembly disclosed above with reference to FIG. 1. As previously discussed, the needle 76 is configured to move along the longitudinal axis 38, and the shaft 42 is coupled to the needle 76 and configured to drive the needle 28 to move along the longitudinal axis 38. The needle 76 may be coupled to the shaft 42 by any suitable connection, such as a threaded connection, a press-fit connection, a shrink-fit connection, a brazed connection, an adhesive connection, other suitable connection(s), or a combination thereof. The shaft 42 may be driven to move along the longitudinal axis 38 by a handle, a hydraulic actuator, a pneumatic actuator, an electromechanical actuator, another suitable actuator, or a combination thereof.

In the illustrated embodiment, the seat assembly 74 includes a housing 78 (e.g., formed from a single piece of material, formed from a non-superhard material, formed from a superhard material, etc.) configured to be disposed within a body of a choke valve assembly (e.g., within the body 12 of the choke valve assembly of FIG. 1). The housing 78 has an internal passage 80 extending along the longitudinal axis 38, and the housing 78 has an inlet 82 extending through the housing 78 along the radial axis 34. The inlet 82 is configured to be disposed within the cavity of the choke valve assembly body and to receive the fluid from the cavity. In certain embodiments, the inlet 82 may include one or more openings disposed about the housing 78 along the circumferential axis 67. For example, inlet 82 may include 1, 2, 3, 4, 5, 6, 7, 8, or more openings disposed along the circumferential axis 67 (e.g., substantially equally spaced from one another). Additionally or alternatively, the inlet may include multiple openings disposed along the longitudinal axis.

In the illustrated embodiment, the housing 78 has an engagement portion 84 positioned on a first longitudinal side 86 of the inlet 82. The engagement portion 84 is configured to engage the needle 76 to substantially block movement of the needle 76 along the radial axis 34. In addition, the seat assembly 74 includes a seat 88 disposed within the internal passage 80 of the housing 78 on a second longitudinal side 90 of the inlet 82, opposite the first longitudinal side 86. The seat 88 has a flow passage 92 extending through the seat 88 (e.g., along the longitudinal axis 38), and the seat 88 is configured to engage the needle 76 while the choke valve assembly is in the closed state. In addition, movement of the needle 76 away from the seat assembly 74 along the longitudinal axis 38 forms an orifice between the needle 76 and the seat 88, thereby facilitating flow of fluid from the cavity of the choke valve assembly body, through the inlet 82, through the flow passage 92 of the seat 88, and into the outlet passage of the choke valve assembly body. Because the engagement portion 84 of the housing 78 substantially blocks movement of the needle 76 along the radial axis 34, vibration of the needle 76 due to the high-pressure flow of fluid through the choke valve assembly may be substantially reduced. Accordingly, the longevity of the needle 76 may be significantly increased, thereby reducing maintenance costs and increasing the operational time of the choke valve assembly.

In the illustrated embodiment, the needle 76 includes a body 94 having a base portion 96 and a tip portion 98. In addition, the needle 76 includes a bearing ring 100 disposed between the body 94 and the housing 78 of the seat assembly 74. As illustrated, the bearing ring 100 is engaged with the engagement portion 84 of the housing 78 to facilitate movement of the needle 76 along the longitudinal axis 38. The bearing ring 100 may also establish a seal that substantially blocks fluid flow between the needle and the housing 78 upstream of the housing inlet 82. The bearing ring 100 may be disposed within a groove in the body 94, and the bearing ring may be formed from any suitable material (e.g., metal, a polymeric material, etc.). For example, in certain embodiments, the bearing ring may be formed from a softer material than the housing.

In the illustrated embodiment, the base portion 96 of the needle body 94 is coupled to the shaft 42 (e.g., by a threaded connection, a press-fit connection, a shrink-fit connection, a brazed connection, an adhesive connection, etc.), and the tip portion 98 of the needle body 94 is coupled to the base portion (e.g., by a threaded connection, a press-fit connection, a shrink-fit connection, a brazed connection, an adhesive connection, etc.). In certain embodiments, the base portion 96 is formed from a non-superhard material, the tip portion 98 is formed from a superhard material, and a tip 102 of the needle 76 is only formed by the tip portion 98. Forming the tip portion 98 from superhard material may substantially increase the longevity of the needle 76 (e.g., as compared to a needle in which the tip portion is formed from a non-superhard material). For example, a significant amount of abrasive material (e.g., sand, particles, etc.) may be entrained within the fluid flowing through the choke valve assembly (e.g., while the choke valve assembly is in the open state). The abrasive material may flow through the orifice, which is formed by the tip portion 98 of the needle 76 and the seat 88, at a substantial speed. However, because the tip portion 98 of the needle 76 is formed from superhard material, wear/abrasion of the tip portion 98 may be substantially reduced (e.g., as compared to a needle having a tip portion formed from a non-superhard material), thereby increasing the longevity of the needle. While the tip portion of the needle/needle body is formed from superhard material, and the base portion of the needle/needle body is formed from non-superhard material in the illustrated embodiment, in other embodiments, the base portion may be formed from superhard material, and/or the tip portion may be formed from non-superhard material.

In the illustrated embodiment, the seat 88 is formed from a first superhard material. In addition, the seat assembly 74 includes a first annular insert 104 disposed within the internal passage 80 of the housing 78 downstream from the seat. The first annular insert 104 has a flow passage 106 extending through the first annular insert 104, and the first annular insert 104 is formed from a second superhard material. Furthermore, in the illustrated embodiment, a maximum cross-sectional area of the seat 88 along the longitudinal axis 38 is greater than a maximum cross-sectional area of the first annular insert 104 along the longitudinal axis. In addition, the seat assembly 74 includes a second annular insert 108 disposed within the internal passage 80 of the housing 78 downstream from the first annular insert 104. The second annular insert 108 has a flow passage 110 extending through the second annular insert 108, and the second annular insert 108 is formed from a non-superhard material.

The illustrated seat assembly may employ any of the techniques for coupling the annular inserts and the seat to the housing disclosed above with reference to FIGS. 2-3. In addition, any of the variations associated with the seat assembly disclosed above with reference to FIGS. 2-3 may apply to the illustrated seat assembly. For example, in certain embodiments, at least one of the annular inserts may be omitted (e.g., all of the annular inserts may be omitted), or the seat assembly may include additional annular inserts. Furthermore, at least one annular insert may be continuous along the circumferential axis, and/or at least one annular insert may be formed from multiple circumferential elements. In addition, the seat may be continuous along the circumferential axis, or the seat may be formed from multiple circumferential elements. In certain embodiments, the maximum cross-sectional area of the seat along the longitudinal axis may be less than or equal to the maximum cross-sectional area of the first annular insert along the longitudinal axis. In addition, in certain embodiments, the seat may be formed from non-superhard material.

In the illustrated embodiment, the seat 88 has multiple recessed cavities 112 formed along the flow passage 92 of the seat 88. The recessed cavities 112 are configured to induce turbulence within the fluid flow through the choke valve assembly, thereby reducing the fluid velocity. As a result, particles entrained within the fluid may impact the downstream components with less force, thereby increasing the longevity of the seat assembly. While the seat 88 includes two recessed cavities 112 in the illustrated embodiment, in other embodiments, the seat may include more or fewer recessed cavities (e.g., 0, 1, 3, 4, 5, 6, or more). For example, in certain embodiments, the recessed cavities may be omitted.

Figure 5:
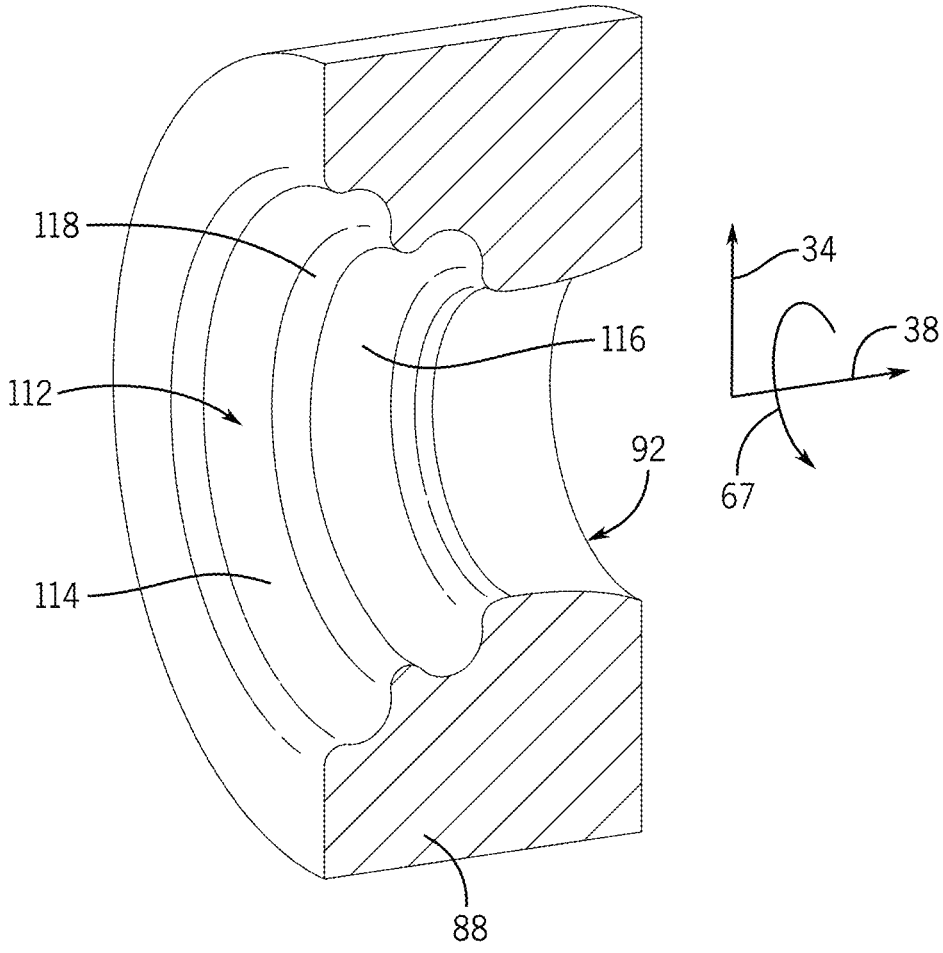
FIG. 5 is a cross-sectional perspective view of a seat of the seat assembly of FIG. 4.

FIG. 5 is a cross-sectional perspective view of a seat 88 of the seat assembly of FIG. 4. As illustrated, the seat 88 has a flow passage 92 extending through the seat 88 (e.g., along the longitudinal axis 38). As previously discussed, the seat 88 is configured to engage the needle while the choke valve assembly is in the closed state, and movement of the needle away from the seat 88 forms an orifice between the needle and the seat 88, thereby facilitating flow of fluid through the flow passage 92. In the illustrated embodiment, the seat 88 includes multiple recessed cavities 112 formed along the flow passage 92. The recessed cavities 112 are configured to induce turbulence within the fluid flow through the choke valve assembly, thereby reducing the fluid velocity. As a result, particles entrained within the fluid may impact the downstream components with less force, thereby increasing the longevity of the seat assembly. The recessed cavity seat 88 disclosed herein may be employed within the seat assembly disclosed above with reference to FIG. 4, the seat assembly disclosed above with reference to FIG. 3, another suitable seat assembly, or a combination thereof. For example, in certain embodiments, the recessed cavity seat 88 disclosed herein may be disposed within an internal passage of a seat assembly housing, or the recessed cavity seat 88 disclosed herein may be coupled to the body of a choke valve assembly (e.g., in which the seat assembly housing is omitted).

In the illustrated embodiment, the seat 88 includes a first recessed cavity 114 and a second recessed cavity 116. In certain embodiments, a first volume of the first recessed cavity 114 is substantially equal to a second volume of the second recessed cavity 116. For example, a difference in volume between the first and second recessed cavities may be less than 10 percent, less than 5 percent, less than 2 percent, less than 1 percent, or less than 0.5 percent. Because the diameter of the first recessed cavity 114 is greater than the diameter of the second recessed cavity 116, the depth of the second recessed cavity 116 may be greater than the depth of the first recessed cavity 114 to establish recessed cavities having substantially equal volumes. While the seat 88 includes two recessed cavities in the illustrated embodiment, in other embodiments, the seat may include more or fewer recessed cavities (e.g., 1, 2, 3, 4, 5, 6, 7, 8, or more). Furthermore, in embodiments having three or more recessed cavities, the spacing between recessed cavities may be substantially equal, or the spacing between recessed cavities may vary along the longitudinal axis.

In addition, in the illustrated embodiment, each recessed cavity is formed by a curved surface, and the protrusion 118 between the recessed cavities has a curved surface. The curved surfaces may induce turbulence, as disclosed above, while substantially reducing or eliminating separation of the entrained particles from the fluid. In other embodiments, at least one protrusion-forming surface of the seat may include a sharp edge configured to break up larger debris entrained within the fluid, thereby enabling the resultant pieces to pass through the orifice between the needle and the seat. Furthermore, in certain embodiments, at least one cavity-forming surface may include at least one substantially flat portion.

In certain embodiments, the recessed cavities 112 are configured to receive the fluid and to direct the fluid directly into the tip of the needle. For example, the recessed cavities 112 are configured to redirect the fluid toward the tip of the needle at an acute angle (e.g., large acute angle) relative to the longitudinal axis 38. The angle may be between about 0 degrees and about 90 degrees, between about 50 degrees and about 85 degrees, or between about 70 degrees and about 85 degrees relative to the longitudinal axis 38. Redirecting the fluid may induce the turbulence (e.g., without substantially changing the phase of the fluid), thereby increasing the pressure drop across the orifice and reducing the speed of the fluid (e.g., as compared to substantially laminar flow through the orifice). For example, the pressure drop may increase (e.g., progressively increase) and the speed of the fluid may decrease (e.g., progressively decrease) as the fluid flows across each recessed cavity. In certain embodiments, the recessed cavity seat 88 may reduce the speed of the fluid by about two thirds and may reduce the energy by about 50 percent. As a result, particles entrained within the fluid may impact downstream components with less force, thereby increasing the longevity of the seat assembly.

Furthermore, the recessed cavities 112 may establish a large change in cross-sectional area of the orifice in response to a small movement of the needle away from the seat 88. For example, as the needle moves away from the seat (e.g., from a position in which the needle is engaged with the seat), the outer surface of the orifice may shift from a non-recessed portion of the seat 88 to a recessed portion of the seat (e.g., at a recessed cavity), thereby substantially increasing the area of the orifice. Accordingly, in response to accumulation of larger particles of debris at the orifice and/or periodically, the needle may be moved away from the seat, such that the outer surface of the orifice is formed by a recessed portion of the seat (e.g., at a recessed cavity), thereby enabling the larger particles of debris to pass through the choke valve assembly. As a result, an upstream filter system, which is configured to collect larger particles of debris, may be obviated.

Figure 6:
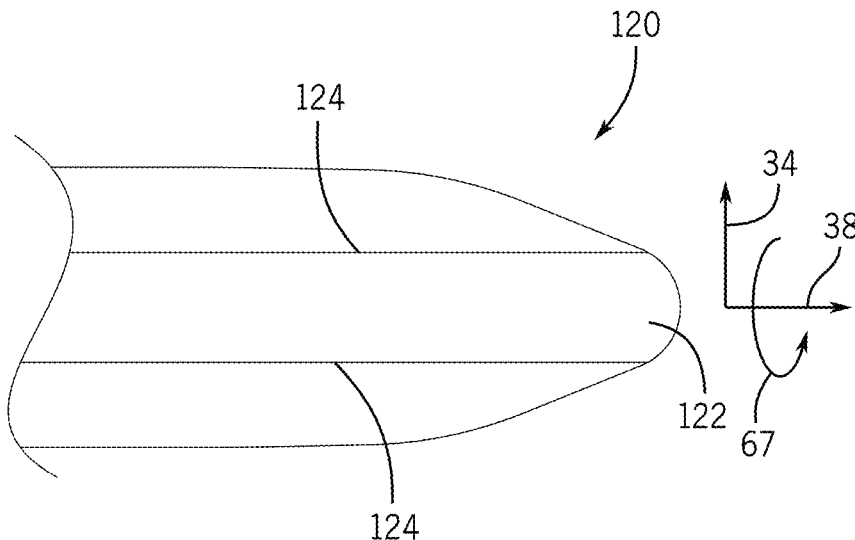
FIG. 6 is a side view of a portion of an embodiment of a needle that may be employed within the choke valve assembly of FIG. 1.

FIG. 6 is a side view of a portion of an embodiment of a needle 120 that may be employed within the choke valve assembly of FIG. 1. In the illustrated embodiment, the needle 120 has a groove 122 extending along the longitudinal axis 38. As illustrated, the groove 122 forms cutting edges 124 that extend along the longitudinal axis 38. The cutting edges 124 are configured to engage debris entrained within the fluid, thereby breaking the debris into smaller pieces that may pass through the orifice formed by the needle 120 and the respective seat. As a result, the possibility of debris accumulation within the choke valve assembly may be reduced. In certain embodiments, the needle 120 is formed from superhard material (e.g., diamond, etc.). Furthermore, in certain embodiments, the cutting edges 124 may be formed from superhard material (e.g., while the remainder of the needle is formed from non-superhard material). While the cutting edges 124 are formed by the groove 122 in the illustrated embodiment, in other embodiments, the cutting edges may extend radially outward from a core portion of the needle. Furthermore, the needle may include any suitable number of grooves/cutting edges.

The needle 120 disclosed above with reference to FIG. 6 may be employed within the choke valve assembly of FIGS. 1-2 and/or within the choke valve assembly of FIG. 4. Furthermore, the needle 120 disclosed above with reference to FIG. 6 may be used in conjunction with the seat assembly of FIG. 3 and/or with the seat of FIG. 5. In addition, the choke valve assembly of FIGS. 1-2 and/or the choke valve assembly of FIG. 4 may include any suitable type of needle (e.g., a needle formed from non-superhard material), and/or any suitable type of needle (e.g., a needle formed from non-superhard material) may be used in conjunction with the seat assembly of FIG. 3 and/or with the seat of FIG. 5. Furthermore, while a right angle choke valve assembly is disclosed herein, any of the embodiments of the seat, the seat assembly, and the needle disclosed above may be employed within an inline choke valve assembly.

Technical effects of the disclosure include increasing the longevity of choke valve assemblies. For example, in certain embodiments, the choke valve assembly includes a seat assembly having a seat and an annular insert disposed within a housing, in which the annular insert is positioned downstream from the seat. A maximum cross-sectional area of the seat along a longitudinal axis of the seat assembly is greater than a maximum cross-sectional area of the annular insert along the longitudinal axis. The larger cross-sectional area of the seat may increase the longevity of the seat assembly. In addition, due to the high cost of superhard material, the smaller maximum cross-sectional area of the annular insert may reduce the cost of the seat assembly.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A seat assembly for a choke valve assembly, comprising:
   a housing having an internal passage, wherein the housing is formed from a non-superhard material;
   a seat disposed within the internal passage of the housing, wherein the seat has a flow passage extending through the seat, the seat is configured to engage a needle of the choke valve assembly while the choke valve assembly is in a closed state, and the seat is formed from a first superhard material, the seat including a first recessed cavity and a second recessed cavity, the first recessed cavity having a first volume and a first depth, the second recessed cavity having a second volume and a second depth greater than the first depth; and
   an annular insert disposed within the internal passage of the housing downstream from the seat, wherein the annular insert has a flow passage extending through the annular insert, the annular insert is formed from a second superhard material, and a maximum cross-sectional area of the seat along a longitudinal axis of the seat assembly is greater than a maximum cross-sectional area of the annular insert along the longitudinal axis.

2. The seat assembly of claim 1, wherein a minimum cross-sectional area of the flow passage of the seat along the longitudinal axis is substantially equal to a cross-sectional area of the flow passage of the annular insert along the longitudinal axis.

3. The seat assembly of claim 1, wherein the first superhard material comprises diamond, the second superhard material comprises diamond, or a combination thereof.

4. The seat assembly of claim 1, wherein the seat comprises a recessed cavity formed along the flow passage of the seat.

5. The seat assembly of claim 1, comprising a second annular insert disposed within the internal passage of the housing downstream from the annular insert, wherein the second annular insert has a flow passage extending through the second annular insert, and the second annular insert is formed from a second non-superhard material.

6. The seat assembly of claim 1, comprising a third annular insert disposed between the seat and the housing at an upstream longitudinal end of the seat assembly, wherein the seat, the housing, and the third annular insert form an upstream longitudinal face of the seat assembly, the third annular insert is formed from a third non-superhard material, and the third non-superhard material of the third annular insert is harder than the non-superhard material of the housing.

7. The seat assembly of claim 1, wherein the first volume of the first recessed cavity is substantially equal to the second volume of the second recessed cavity.

8. The seat assembly of claim 1, wherein the first recessed cavity has a larger diameter than the second recessed cavity.

9. The seat assembly of claim 1, wherein the first recessed cavity and second recessed cavity are axially spaced along the flow passage.

10. The seat assembly of claim 1, wherein the seat is removably coupled to the housing.

11. A choke valve assembly, comprising:

a needle configured to move along a longitudinal axis of the choke valve assembly;

a shaft coupled to the needle and configured to drive the needle to move along the longitudinal axis; and a seat assembly, comprising:

a housing configured to be disposed within a body of the choke valve assembly, wherein the housing has an internal passage extending along the longitudinal axis and an inlet extending through the housing along a radial axis of the choke valve assembly, the housing has an engagement portion positioned on a first longitudinal side of the inlet, and the engagement portion is configured to engage the needle to substantially block movement of the needle along the radial axis; and a seat disposed within the internal passage of the housing on a second longitudinal side of the inlet, opposite the first longitudinal side, wherein the seat has a flow passage extending through the seat, and the seat is configured to engage the needle while the choke valve assembly is in a closed state, the seat including a first recessed cavity and a second recessed cavity, the first recessed cavity having a first volume and a first depth, the second recessed cavity having a second volume and a second depth greater than the first depth.

12. The choke valve assembly of claim 11, wherein the needle is formed from a first superhard material, the seat is formed from a second superhard material, or a combination thereof.

13. The choke valve assembly of claim 11, wherein the seat comprises a recessed cavity formed along the flow passage of the seat.

14. The choke valve assembly of claim 11, wherein the seat is formed from a first superhard material, the seat assembly comprises an annular insert disposed within the internal passage of the housing downstream from the seat, the annular insert has a flow passage extending through the annular insert, and the annular insert is formed from a second superhard material.

15. The choke valve assembly of claim 14, wherein a maximum cross-sectional area of the seat along the longitudinal axis is greater than a maximum cross-sectional area of the annular insert along the longitudinal axis.

16. The choke valve assembly of claim 14, wherein the seat assembly comprises a second annular insert disposed within the internal passage of the housing downstream from the annular insert, and the second annular insert has a flow passage extending through the second annular insert.

17. The choke valve assembly of claim 16, wherein the second annular insert is formed from a non-superhard material.

18. The choke valve assembly of claim 11, wherein the needle comprises a base portion and a tip portion, the tip portion is coupled to the base portion, the base portion is formed from a non-superhard material, the tip portion is formed from a superhard material, and a tip of the needle is only formed by the tip portion.

\*    \*    \*    \*    \*